United States Patent
Young et al.

(10) Patent No.: US 9,972,837 B2
(45) Date of Patent: May 15, 2018

(54) HYDROGEN STORAGE MULTI-PHASE ALLOYS

(71) Applicants: BASF Corporation, Florham Park, NJ (US); FDK Corporation, Minato-ku, Tokyo (JP)

(72) Inventors: Kwo Young, Troy, MI (US); Taihei Ouchi, Rochester, MI (US); Jean Nei, Southgate, MI (US); Diana Wong, Sterling Heights, MI (US); Shigekazu Yasuoka, Takasaki (JP)

(73) Assignees: BASF Corporation, Florham Park, NJ (US); FDK Corporation, Tokyo (JP)

( * ) Notice: Subject to any disclaimer, the term of this patent is extended or adjusted under 35 U.S.C. 154(b) by 0 days. days.

(21) Appl. No.: 14/710,805

(22) Filed: May 13, 2015

(65) Prior Publication Data

US 2015/0333327 A1 Nov. 19, 2015

Related U.S. Application Data

(60) Provisional application No. 61/996,981, filed on May 14, 2014, provisional application No. 61/996,984, filed on Jun. 10, 2014, provisional application No. 62/132,150, filed on Mar. 12, 2015.

(51) Int. Cl.
| | |
|---|---|
| C22C 30/02 | (2006.01) |
| H01M 4/38 | (2006.01) |
| C22C 30/00 | (2006.01) |
| H01M 4/90 | (2006.01) |
| H01M 10/30 | (2006.01) |
| H01M 8/083 | (2016.01) |
| H01M 12/08 | (2006.01) |
| C22C 19/03 | (2006.01) |
| C22C 19/00 | (2006.01) |
| C01B 3/00 | (2006.01) |

(52) U.S. Cl.
CPC .......... *H01M 4/383* (2013.01); *C01B 3/0047* (2013.01); *C22C 19/007* (2013.01); *C22C 19/03* (2013.01); *C22C 30/00* (2013.01); *C22C 30/02* (2013.01); *H01M 4/9041* (2013.01); *H01M 8/083* (2013.01); *H01M 10/30* (2013.01); *H01M 12/08* (2013.01); *Y02E 60/327* (2013.01)

(58) Field of Classification Search
CPC ......... C22C 19/03; C22C 19/02; C22C 19/00; H01M 4/383; H01M 4/9041; H01M 10/30

See application file for complete search history.

(56) References Cited

U.S. PATENT DOCUMENTS

2010/0178561 A1* 7/2010 Kakeya et al. ............ 429/218.2

FOREIGN PATENT DOCUMENTS

| JP | 2007291474 A | 11/2007 |
|---|---|---|
| JP | 2011021262 A | 2/2011 |

OTHER PUBLICATIONS

Int. Report on Patentability dated Jul. 24, 2015.
English Abstract of JP 2007291474A dated Nov. 8, 2007.
English Abstract of JP 2011021262A dated Feb. 3, 2011.
English translation of Chinese Office Action for corresponding CN Application No. 201580024677.1 dated Nov. 27, 2017.
Extended European Search Report (EESR) from corresponding EP Application No. 15792844.1 dated Oct. 11, 2017.

* cited by examiner

Primary Examiner — Rebecca Lee
(74) Attorney, Agent, or Firm — Dinsmore & Shohl LLP

(57) ABSTRACT

A multi-phase hydrogen storage alloy comprising a hexagonal $Ce_2Ni_7$ phase and a hexagonal $Pr_5Co_{19}$ phase, where the $Ce_2Ni_7$ phase abundance is ≥30 wt % and the $Pr_5Co_{19}$ phase abundance is ≥8 wt % and where the alloy comprises a mischmetal where Nd in the mischmetal is <50 at % or a multi-phase hydrogen storage alloy comprising one or more rare earth elements, a hexagonal $Ce_2Ni_7$ phase and a hexagonal $Pr_5Co_{19}$ phase, where the $Ce_2Ni_7$ phase abundance is from about 30 to about 72 wt % and the $Pr_5Co_{19}$ phase abundance is ≥8 wt % have improved electrochemical performance. The alloys are useful in an electrode in a metal hydride battery, a fuel cell or a metal hydride air battery.

13 Claims, No Drawings

HYDROGEN STORAGE MULTI-PHASE ALLOYS

The present invention relates to hydrogen storage multi-phase alloys with improved electrochemical properties. The alloys are for example modified rare earth $A_2B_7$ type alloys.

Alloys capable of absorbing and desorbing hydrogen may be employed as hydrogen storage media and/or as electrode materials for metal hydride batteries, fuel cells, metal hydride air battery systems and the like. Such materials are known as metal hydride (MH) materials.

Rare earth Mg based $AB_3$ or $A_2B_7$ type metal hydride alloys are promising candidates to replace $AB_5$ MH alloys as the negative electrodes in nickel metal hydride (NiMH) batteries due to their high capacities and good high rate dischargeability.

Surprisingly, it has been found that certain metal hydride alloys exhibit improved electrochemical performance.

Accordingly, disclosed is a multi-phase hydrogen storage alloy, comprising
a hexagonal $Ce_2Ni_7$ phase and a hexagonal $Pr_5Co_{19}$ phase,
where the $Ce_2Ni_7$ phase abundance is ≥30 weight percent (wt %) and the $Pr_5Co_{19}$ phase abundance is ≥8 wt % and
where the alloy comprises a mischmetal where Nd in the mischmetal is <50 atomic percent (at %).

Also disclosed is a multi-phase hydrogen storage alloy, comprising
one or more rare earth elements, a hexagonal $Ce_2Ni_7$ phase and a hexagonal $Pr_5Co_{19}$ phase,
where the $Ce_2Ni_7$ phase abundance is from about 30 wt % to about 72 wt % and the $Pr_5Co_{19}$ phase abundance is ≥ 8 wt %.

The present hydrogen storage alloys have improved electrochemical performance.

DETAILED DISCLOSURE

Present alloys are prepared for instance via induction melting or arc melting under an inert atmosphere. The alloys may be further annealed under an inert atmosphere, for instance at a temperature of <950° C. Preparation methods are taught in U.S. Pat. Nos. 8,053,114, 8,124,281, 7,829,220, 8,257,862 and 8,409,753 and U.S. Pub. No. 2006/057019, the contents of which are hereby incorporated by reference.

Electrochemical performance is defined by capacity and high rate dischargeability (HRD).

Half cell HRD is defined as the ratio of discharge capacity measured at 100 mA g$^{-1}$ to that measured at 8 mA g$^{-1}$. The discharge capacity of an alloy is measured in a flooded cell configuration against a partially pre-charged $Ni(OH)_2$ positive electrode. No binder or other metal additive is added to the pressed sample electrode. No alkaline pretreatment is applied before the half cell measurement. Each sample electrode is charged at a constant current density of 100 mA g$^{-1}$ for 5 h and then discharged at a current density of 100 mA g$^{-1}$ followed by two pulls at 25 and 8 mA g$^{-1}$. Capacities are measured at the $2^{nd}$ cycle.

The $2^{nd}$ cycle capacity at 100 mA g$^{-1}$ of a present alloy is for example ≥320, ≥325, ≥330, ≥333, ≥340 or ≥345.

The HRD of a present alloy is for example ≥96% or ≥97% at the $2^{nd}$ cycle.

The alloys contain a hexagonal $Ce_2Ni_7$ phase in an abundance of ≥30 wt % and a hexagonal $Pr_5Co_{19}$ phase in an abundance of ≥8 wt %. For instance present alloys contain a hexagonal $Ce_2Ni_7$ phase in an abundance of ≥40 wt % and a hexagonal $Pr_5Co_{19}$ phase in an abundance of ≥13 wt %.

Phase abundance is reported in weight percent (wt %), based on the total content of the alloy.

For instance, the abundance of the hexagonal $Ce_2Ni_7$ phase is ≥35, ≥40, ≥45, ≥50 or ≥60 wt %, based on the total alloy.

The abundance of the hexagonal $Ce_2Ni_7$ phase may be from about 30 to about 72 wt %, from about 30 to about 71 wt %, from about 30 to about 75 wt %, from about 35 to about 72 wt %, from about 40 to about 68 wt %, from about 45 to about 66 wt % or from about 50 to about 65 wt %, based on the total alloy.

The abundance of the hexagonal $Pr_5Co_{19}$ phase is for example is ≥8, ≥9, ≥10, ≥11, ≥12, ≥13, ≥14, ≥15, ≥16, ≥17, ≥18 or ≥19 wt %, based on the total alloy.

The abundance of the hexagonal $Pr_5Co_{19}$ phase may be from about 8 to about 30 wt %, from about 10 to about 25 wt %, from about 13 to about 23 wt %, from about 16 to about 22 wt %, from about 18 to about 21 wt %, from about 8 to about 12 wt % or from about 8 to about 11 wt %.

Advantageously, the present alloys may contain at least one further phase selected from the group consisting of hexagonal $MgZn_2$, hexagonal $CeNi_3$, rhombohedral $PuNi_3$, rhombohedral $Pr_2Ni_7$, rhombohedral $Ce_5Co_{19}$ and hexagonal $CaCu_5$.

Alternatively, the present alloys may contain at least two further phases or may contain at least three further phases selected from the group consisting of hexagonal $MgZn_2$, hexagonal $CeNi_3$, rhombohedral $PuNi_3$, rhombohedral $Pr_2Ni_7$, rhombohedral $Ce_5Co_{19}$ and hexagonal $CaCu_5$.

In one embodiment, the present alloys further contain at least one of, at least two of or all three of hexagonal $CeNi_3$, rhombohedral $PuNi_3$ and rhombohedral $Ce_5Co_{19}$ phases.

In certain alloys containing one or both of $CeNi_3$ and $PuNi_3$ phases, these two phases together are advantageously present in an abundance of ≤25, ≤24, ≤20, ≤17, ≤15, ≤14, ≤13 or ≤12 wt %, based on the total alloy. For instance, $CeNi_3$ and $PuNi_3$ together are present in an abundance of from 0 to about 25 wt %, from >0 to about 20 wt %, from 1 to about 15 wt %, from 1 to about 13 wt %, from 1 to about 12 wt % or from 1 to about 11 wt %, based on the total alloy.

The $Pr_5Co_{19}$ and $Ce_5Co_{19}$ phases, when both present, are for example present in a combined abundance of >27 wt %, for instance from about 28 to about 70 wt %, based on the total alloy.

The hexagonal $MgZn_2$ phase for instance is present in an abundance of from 0 to about 2 wt %, based on the total alloy.

The hexagonal $CeNi_3$ phase may be present in an abundance of from about 1 to about 21 wt % or from about 2 to about 20 wt %, based on the total alloy.

The rhombohedral $PuNi_3$ phase may be present in an abundance of from about 2 to about 10 wt % or from about 4 to about 8 wt %, based on the total alloy.

The rhombohedral $Pr_2Ni_7$ phase is present for instance in an abundance of from 0 to about 2 wt %, based on the total alloy.

The rhombohedral $Ce_5Co19$ phase may be present in an abundance of from about 3 to about 12 wt %, from about 4 to about 11 wt % or from about 5 to about 10 wt %, based on the total alloy.

The hexagonal $CaCu_5$ phase is present for instance in an abundance of from 0 to about 16 wt % or from 0 to about 15 wt %, based on the total alloy.

The alloys contain for instance one or more rare earth elements, Mg and Ni. For instance present alloys comprise Mg, Ni and one or more elements selected from the group consisting of lanthanides, Sc and Y. For example present alloys comprise Mg, Ni and one or more of Ce, La, Nd and Pr. The present alloys may comprise Mg, Ni and a mischmetal.

The mischmetal of a present alloy contains for example La, Pr and Nd.

Advantageously, the Nd content in the mischmetal is <50 atomic percent (at %), based on the mischmetal. The mischmetal further advantageously contains no Ce.

For instance, present alloys contain from about 17 to about 22 at % one or more rare earth elements, including mischmetal, from about 3 to about 5 at % Mg, from about 63 to about 81 at % Ni, from about 2 to about 6 at % Al and from 0 to about 4 at % of one or more elements selected from the group consisting of B, Co, Cu, Fe, Cr, Mn, Zn, Si and Zr.

These atomic percents (at %) are based on the alloy.

The present alloys are ABx type alloys where x is from about 2 to about 5.

For example, the present alloys are modified A2B7 type alloys containing
 i) one or more rare earth elements and Mg and
 ii) Ni and one or more elements selected from the group consisting of B, Co, Cu, Fe, Cr, Mn, Zn, Si and Zr,
where the ii) to i) atomic ratio is from about 3.1 to about 3.6, from about 3.2 to about 3.5 or from about 3.3 to about 3.4.

Further subject of the present invention is a metal hydride battery comprising at least one anode capable of reversibly charging and discharging hydrogen, at least one cathode capable of reversible oxidation, a casing having said anode and cathode positioned therein, a separator separating the cathode and the anode and an electrolyte in contact with both the anode and the cathode, where the anode comprises a present hydrogen storage alloy.

The present battery is capable of charging a large amount of hydrogen under one polarity and for discharging a desired amount of hydrogen under the opposite polarity.

Also subject of the invention is an alkaline fuel cell comprising at least one hydrogen electrode, at least one oxygen electrode and at least one gas diffusion material, where the hydrogen electrode comprises a present hydrogen storage alloy.

Also subject of the invention is a metal hydride air battery comprising at least one air permeable cathode, at least one anode, at least one air inlet and an electrolyte in contact with both the anode and the cathode, where the anode comprises a present hydrogen storage alloy.

The term "a" referring to elements of an embodiment may mean "one" or "one or more".

The term "about" refers to variation that can occur, for example, through typical measuring and handling procedures; through inadvertent error in these procedures; through differences in the manufacture, source, or purity of ingredients used; through differences in methods used; and the like. The term "about" also encompasses amounts that differ due to different equilibrium conditions for a composition resulting from a particular initial mixture. Whether or not modified by the term "about," embodiments and claims include equivalents to the recited quantities.

All numeric values herein are modified by the term "about," whether or not explicitly indicated. The term "about" generally refers to a range of numbers that one of skill in the art would consider equivalent to the recited value (i.e., having the same function and/or result). In many instances, the term "about" may include numbers that are rounded to the nearest significant figure.

A value modified by the term "about" of course includes the specific value. For instance, "about 5.0" must include 5.0.

Following are some embodiments of the invention.

E1. A multi-phase hydrogen storage alloy, comprising
 a hexagonal $Ce_2Ni_7$ phase and a hexagonal $Pr_5Co_{19}$ phase,
 where the $Ce_2Ni_7$ phase abundance is ≥30 wt % and the $Pr_5Co_{19}$ phase abundance is 8 wt %, based on the total alloy and
 where the alloy comprises a mischmetal where Nd in the mischmetal is <50 at %.

E2. An alloy according to embodiment 1 where the abundance of the $Ce_2Ni_7$ phase is ≥35, ≥40, ≥45, ≥50 or ≥60 wt % or the abundance of the $Ce_2Ni_7$ phase is from about 30 to about 72 wt %, from about 30 to about 71 wt %, from about 30 to about 75 wt %, from about 35 to about 72 wt %, from about 40 to about 68 wt %, from about 45 to about 66 wt % or from about 50 to about 65 wt %, based on the total alloy.

E3. An alloy according to embodiments 1 or 2 where the abundance of the $Pr_5Co_{19}$ phase is ≥9, ≥10, ≥11, ≥12, ≥13, ≥14, ≥15, ≥16, ≥17, ≥18 or ≥19 wt % or the abundance of the $Pr_5Co_{19}$ phase is from about 8 to about 30 wt %, from about 10 to about 25 wt %, from about 13 to about 23 wt %, from about 16 to about 22 wt %, from about 18 to about 21 wt %, from about 8 to about 12 wt % or from about 8 to about 11 wt %, based on the total alloy.

E4. An alloy according to any of the preceding embodiments where the alloy further contains at least one, at least two or at least three phases selected from the group consisting of hexagonal $MgZn_2$, hexagonal $CeNi_3$, rhombohedral $PuNi_3$, rhombohedral $Pr_2Ni_7$, rhombohedral $Ce_5Co_{19}$ and hexagonal $CaCu_5$.

E5. An alloy according to any of the preceding embodiments where the alloy further contains at least one, at least two or all three of hexagonal $CeNi_3$, rhombohedral $PuNi_3$ and rhombohedral $Ce_5Co_{19}$ phases.

E6. An alloy according to any of the preceding embodiments which contains a hexagonal $CeNi_3$ phase and/or a rhombohedral $PuNi_3$ phase, where the combined abundance thereof is ≤25, ≤24, ≤20, ≤17, ≤15, ≤14, ≤13 or ≤12 wt %, based on the total alloy; or where the combined abundance is from 0 to about 25 wt %, from >0 to about 20 wt %, from 1 to about 15 wt %, from 1 to about 13 wt %, from 1 to about 12 wt % or from 1 to about 11 wt %, based on the total alloy.

E7. An alloy according to any of the preceding embodiments comprising a hexagonal $MgZn_2$ phase in an abundance of from 0 to about 2 wt %, a hexagonal $CeNi_3$ phase in an abundance of from about 1 to about 21 wt % or from about 2 to about 20 wt %, a rhombohedral $PuNi_3$ phase in an abundance of from about 2 to about 10 wt % or from about 4 to about 8 wt %, a rhombohedral $Pr_2Ni_7$ phase in an abundance of from 0 to about 2 wt %, a rhombohedral $Ce_5Co_{19}$ phase in an abundance of from about 3 to about 12 wt %, from about 4 to about 11 wt % or from about 5 to about 10 wt % and a hexagonal CaCu5 phase in an abundance of from 0 to about 16 wt % or from 0 to about 15 wt %, based on the total alloy.

E8. An alloy according to any of the preceding embodiments comprising a mischmetal, Mg and Ni, comprising a mischmetal, Mg, Ni, Al and Mn or comprising a mischmetal, Mg, Ni and Al.

E9. An alloy according to any of the preceding embodiments where the mischmetal comprises a mixture of elements selected from the group consisting of lanthanides, Sc and Y, comprises a mixture of elements selected from the group consisting of Ce, La, Nd and Pr or comprises La, Pr and Nd.

E10. An alloy according to any of the preceding embodiments where the mischmetal contains no Ce.

E11. An alloy according to any of the preceding embodiments comprising from about 17 to about 22 at % mischmetal, from about 3 to about 5 at % Mg, from about 63 to about 81 at % Ni, from about 2 to about 6 at % Al and from 0 to about 4 at % of one or more elements selected from the group consisting of B, Co, Cu, Fe, Cr, Mn, Zn, Si and Zr.

E12. An alloy according to any of the preceding embodiments comprising
   i) a mischmetal and Mg and
   ii) Ni and one or more elements selected from the group consisting of B, Co, Cu, Fe, Cr, Mn, Zn, Si and Zr,
   where the ii) to i) atomic ratio is from about 3.1 to about 3.6, from about 3.2 to about 3.5 or from about 3.3 to about 3.4.

Following are more embodiments of the invention.

E1. A multi-phase hydrogen storage alloy, comprising one or more rare earth elements, a hexagonal $Ce_2Ni_7$ phase and a hexagonal $Pr_5Co_{19}$ phase,
   where the $Ce_2Ni_7$ phase abundance is from about 30 to about 72 wt % and the $Pr_5Co_{19}$ phase abundance is ≥8 wt %, based on the total alloy.

E2. An alloy according to embodiment 1 where the abundance of the $Ce_2Ni_7$ phase is from about 30 to about 71 wt %, from about 35 to about 72 wt %, from about 40 to about 68 wt %, from about 45 to about 66 wt % or from about 50 to about 65 wt %, based on the total alloy.

E3. An alloy according to embodiments 1 or 2 where the abundance of the $Pr_5Co_{19}$ phase is ≥9, ≥10, ≥11, ≥12, ≥13, ≥14, ≥15, ≥16, ≥17, ≥18 or ≥19 wt % or the abundance of the $Pr_5Co_{19}$ phase is from about 8 to about 30 wt %, from about 10 to about 25 wt %, from about 13 to about 23 wt %, from about 16 to about 22 wt %, from about 18 to about 21 wt %, from about 8 to about 12 wt % or from about 8 to about 11 wt %, based on the total alloy.

E4. An alloy according to any of the preceding embodiments where the alloy further contains at least one, at least two or at least three phases selected from the group consisting of hexagonal $MgZn_2$, hexagonal $CeNi_3$, rhombohedral $PuNi_3$, rhombohedral $Pr_2Ni_7$, rhombohedral $Ce_5Co19$ and hexagonal $CaCu_5$.

E5. An alloy according to any of the preceding embodiments where the alloy further contains at least one, at least two or all three of hexagonal $CeNi_3$, rhombohedral $PuNi_3$ and rhombohedral $Ce_5Co19$ phases.

E6. An alloy according to any of the preceding embodiments which contains a hexagonal $CeNi_3$ phase and/or a rhombohedral $PuNi_3$ phase, where the combined abundance thereof is ≤25, ≤24, ≤20, ≤17, ≤15, ≤14, ≤13 or ≤12 wt %; or where the combined abundance is from 0 to about 25 wt %, from >0 to about 20 wt %, from 1 to about 15 wt %, from 1 to about 13 wt %, from 1 to about 12 wt % or from 1 to about 11 wt %, based on the total alloy.

E7. An alloy according to any of the preceding embodiments comprising a hexagonal $MgZn_2$ phase in an abundance of from 0 to about 2 wt %, a hexagonal $CeNi_3$ phase in an abundance of from about 1 to about 21 wt % or from about 2 to about 20 wt %, a rhombohedral $PuNi_3$ phase in an abundance of from about 2 to about 10 wt % or from about 4 to about 8 wt %, a rhombohedral $Pr_2Ni_7$ phase in an abundance of from 0 to about 2 wt %, a rhombohedral $Ce_5Co_{19}$ phase in an abundance of from about 3 to about 12 wt %, from about 4 to about 11 wt % or from about 5 to about 10 wt % and a hexagonal $CaCu_5$ phase in an abundance of from 0 to about 16 wt % or from 0 to about 15 wt %, based on the total alloy.

E8. An alloy according to any of the preceding embodiments comprising one or more rare earth elements, Mg and Ni, comprising Mg, Ni and one or more elements selected from the group consisting of lanthanides, Sc and Y, comprising Mg, Ni and one or more elements selected from the group consisting of Ce, La, Nd and Pr or comprising Mg, Ni and a mischmetal.

E9. An alloy according to any of the preceding embodiments comprising a mischmetal.

E10. An alloy according to any of the preceding embodiments comprising a mischmetal where the mischmetal comprises a mixture of elements selected from the group consisting of lanthanides, Sc and Y, comprises a mixture of elements selected from the group consisting of Ce, La, Nd and Pr or comprises La, Pr and Nd.

E11. An alloy according to any of the preceding embodiments comprising a mischmetal where the Nd content in the mischmetal is <50 at % and/or where the mischmetal contains no Ce.

E12. An alloy according to any of the preceding embodiments comprising from about 17 to about 22 at % mischmetal, from about 3 to about 5 at % Mg, from about 63 to about 81 at % Ni, from about 2 to about 6 at % Al and from 0 to about 4 at % of one or more elements selected from the group consisting of B, Co, Cu, Fe, Cr, Mn, Zn, Si and Zr.

E13. An alloy according to any of the preceding embodiments comprising
   i) a mischmetal and Mg and
   ii) Ni and one or more elements selected from the group consisting of B, Co, Cu, Fe, Cr, Mn, Zn, Si and Zr,
   where the ii) to i) atomic ratio is from about 3.1 to about 3.6, from about 3.2 to about 3.5 or from about 3.3 to about 3.4.

Following are more embodiments of the invention.

E1. An alloy according to any of the above embodiments (any embodiment of the above 2 sets of embodiments) where the $2^{nd}$ cycle capacity at 100 mA $g^{-1}$ is ≥320, ≥325, ≥330, ≥333, ≥340 or ≥345 and/or the HRD is ≥96% or ≥97% at the $2^{nd}$ cycle.

E2. A metal hydride battery, an alkaline fuel cell or a metal hydride air battery comprising an electrode comprising a hydrogen storage alloy according to any of the above embodiments.

E3. A metal hydride battery comprising at least one anode capable of reversibly charging and discharging hydrogen, at least one cathode capable of reversible oxidation, a casing having said anode and cathode positioned therein, a separator separating the cathode and the anode and an electrolyte in contact with both the anode and the cathode, where the anode comprises a hydrogen storage alloy according to any of the above embodiments.

E4. An alkaline fuel cell comprising at least one hydrogen electrode, at least one oxygen electrode and at least one gas diffusion material, where the hydrogen electrode comprises a hydrogen storage alloy according to any of the above embodiments.

E5. A metal hydride air battery comprising at least one air permeable cathode, at least one anode, at least one air inlet and an electrolyte in contact with both the anode and the cathode, where the anode comprises a hydrogen storage alloy according to any of the above embodiments.

E6. Use of an alloy according to any of the above embodiments in an electrode in a metal hydride battery, a fuel cell or a metal hydride air battery.

E7. Use of an alloy according to any of the above embodiments as a hydrogen storage media.

The following Examples illustrate the present invention.

Example 1 Mm-Mg—Ni—Al—Mn alloys

Alloy ingots are prepared with high frequency induction melting and annealed at <950° C. in an argon atmosphere. The alloy ingots are crushed, ground into a powder and sieved through a 200 mesh. The chemical composition of each sample is examined using a Varian LIBERTY 100 inductively-coupled plasma (ICP) system.

The following alloys are designed with actual amounts obtained by ICP. Each alloy is designed for a ii)/i) atomic ratio (Ni—Al—Mn)/Mm-Mg of 3.31. Amounts are at % based on the alloy. During melting, extra Mg is added to compensate for loss due to evaporation.

| alloy | | Mm | Mg | Ni | Al | Mn | ii)/i) ratio |
|---|---|---|---|---|---|---|---|
| F1 | design | 19.3 | 3.9 | 72.8 | 4.0 | 0.0 | 3.31 |
|    | ICP    | 19.0 | 3.9 | 72.5 | 4.6 | nd  | 3.37 |
| F2 | design | 19.3 | 3.9 | 70.5 | 4.0 | 2.3 | 3.31 |
|    | ICP    | 19.1 | 3.7 | 70.8 | 4.0 | 2.3 | 3.38 |
| F3 | design | 19.3 | 3.9 | 68.1 | 4.0 | 4.7 | 3.31 |
|    | ICP    | 19.2 | 3.7 | 68.3 | 3.9 | 4.7 | 3.36 |
| F4 | design | 19.3 | 3.9 | 65.8 | 4.0 | 7.0 | 3.31 |
|    | ICP*   | 19.3 | 4.0 | 65.4 | 4.2 | 7.0 | 3.29 |
| F5 | design | 19.3 | 3.9 | 63.5 | 4.0 | 9.3 | 3.31 |
|    | ICP    | 19.2 | 3.9 | 63.5 | 4.0 | 9.4 | 3.33 |

*ICP detected 0.1 at % Fe in sample F4, most likely Fe pick-up from the steel mold.

The term "nd" means "not detectable" or "below detection limit". The ii)/i) ratio is the atomic ratio (Ni—Al—Mn—Fe)/(Mm-Mg).

Mischmetal (Mm) contains La, Pr and Nd, where Nd is about 40 at % thereof.

Phase abundances of the alloys are determined by X-ray diffractometry (XRD) with a Philips X'PERT PRO X-ray diffractometer and are reported below. "R" is rhombohedral, "H" is hexagonal. Abundance is weight percent (wt %) based on the total alloy.

| alloy | $MgZn_2$ | $CeNi_3$ | $PuNi_3$ | $Ce_2Ni_7$ | $Pr_2Ni_7$ | $Pr_5Co_{19}$ | $Ce_5Co_{19}$ | $CaCu_5$ | $Nd_2O_3$ |
|---|---|---|---|---|---|---|---|---|---|
| F1 | 0.0 | 2.0  | 7.7 | 62.0 | 0.0  | 19.2 | 9.1  | 0.0  | 0.0 |
| F2 | 0.0 | 19.5 | 4.1 | 45.2 | 0.0  | 11.0 | 5.8  | 14.4 | 0.0 |
| F3 | 0.0 | 23.1 | 0.0 | 44.4 | 0.0  | 0.0  | 21.3 | 10.8 | 0.4 |
| F4 | 1.9 | 26.3 | 0.0 | 48.3 | 11.5 | 0.0  | 0.0  | 11.9 | 0.0 |
| F5 | 0.0 | 32.2 | 0.0 | 39.6 | 11.5 | 0.0  | 0.0  | 16.7 | 0.0 |

Alloys F1 and F2 are inventive, alloys F3-F5 are comparative.

The $MgZn_2$, $CeNi_3$, $Ce_2Ni_7$, $Pr_5Co_{19}$ and $CaCu_5$ phases are hexagonal. The $PuNi_3$, $Pr_2Ni_7$ and $Ce_5Co_{19}$ phases are rhombohedral. All alloys show multi-phase nature comprising varying amounts of $AB_2$, $AB_5$ and superlattice phases ($AB_3$, $A_2B_7$ and $A_5B_{19}$). Two crystal structures, rhombohedral and hexagonal are available for the $AB_3$, $A_2B_7$ and $A_5B_{19}$ phases. JADE 9 software is used to calculate the phase abundances.

The Mn-free alloy F1 has a main phase of hexagonal $Ce_2Ni_7$ (62.0 wt %) and 4 secondary phases of hexagonal $Pr_5Co_{19}$ (19.2 wt %), rhombohedral $Ce_5Co_{19}$ (9.1 wt %), rhombohedral $PuNi_3$ (7.7 wt %) and hexagonal $CeNi_3$ (2.0 wt %) structures.

Electrochemical results are below.

| alloy | $2^{nd}$ cycle cap.[1] at 100 mA/g | $2^{nd}$ cycle cap.[1] at 8 mA/g | $HRD^2$ | act. cycle no.[3] | $D^4$ | $I_o^5$ |
|---|---|---|---|---|---|---|
| F1 | 346 | 354 | 97.7 | 2 | 3.2 | 51.5 |
| F2 | 334 | 346 | 96.5 | 2 | 2.2 | 43.9 |
| F3 | 317 | 332 | 95.5 | 1 | 1.5 | 24.0 |
| F4 | 309 | 328 | 94.2 | 1 | 1.3 | 19.4 |
| F5 | 297 | 317 | 93.7 | 1 | 1.2 | 15.0 |

[1]discharge capacity (mAh/g) of an alloy is measured in a flooded cell configuration against a partially pre-charged $Ni(OH)_2$ positive electrode; no binder or other metal additive is added to the pressed sample electrode; no alkaline pretreatment is applied before the half cell measurement; each sample electrode is charged at a constant current density of 100 mA $g^{-1}$ for 5 h and then discharged at a current density of 100 mA $g^{-1}$ followed by two pulls at 25 and 8 mA $g^{-1}$; capacities are measured at the $2^{nd}$ cycle
[2]half cell high rate dischargeability (HRD) is the percent ratio of discharge capacity measured at 100 mA $g^{-1}$ to that measured at 8 mA $g^{-1}$
[3]number of activation cycles to reach maximum capacity
[4]bulk diffusion coefficient at room temperature ($10^{-10}$ $cm^2$/s)
[5]surface exchange current at room temperature (mA/g)

It is seen that inventive alloys F1 and F2 have outstanding $2^{nd}$ cycle capacity at 100 mA/g and outstanding high rate dischargeability.

It is also seen that inventive alloys exhibit better diffusion (D) and have a more reactive surface ($I_o$) than comparative alloys.

The invention claimed is:

1. A multi-phase hydrogen storage alloy, comprising at least a hexagonal Ce2Ni7 phase and a Pr5Co19 phase, where the Ce2Ni7 phase abundance is ≥30 wt % and the Pr5Co19 phase abundance is ≥8 wt % based on the total alloy and
where the alloy comprises a mischmetal where Nd in the mischmetal is <50 at % and the alloy further contains hexagonal CeNi3 and rhombohedral PuNi3, and wherein the alloy comprises a hexagonal MgZn2 phase in an abundance of from 0 to about 2 wt %, a hexagonal CeNi3 phase in an abundance of from about 1 to about 21 wt %, a rhombohedral PuNi3 phase in an abundance of from about 2 to about 10 wt %, a rhombohedral Pr2Ni7 phase in an abundance of from 0 to about 2 wt %, a rhombohedral Ce5Co19 phase in an abundance of from about 3 to about 12 wt % and a hexagonal CaCu5 phase in an abundance of from 0 to about 16 wt %, based on the total alloy.

2. An alloy according to claim 1 where the abundance of the Ce2Ni7 phase is from about 30 to about 72 wt %, based on the total alloy.

3. An alloy according to claim 1 where the abundance of the Pr5Co19 phase is from about 8 to about 30 wt %, based on the total alloy.

4. An alloy according to claim 1 comprising a mischmetal, Mg and Ni.

5. An alloy according to claim 1 where the mischmetal comprises La, Pr and Nd.

6. An alloy according to claim 1 where the mischmetal contains no Ce.

7. An alloy according to claim 1 comprising from about 17 to about 22 at % mischmetal, from about 3 to about 5 at % Mg, from about 63 to about 81 at % Ni, from about 2 to about 6 at % Al and from 0 to about 4 at % of one or more elements selected from the group consisting of B, Co, Cu, Fe, Cr, Mn, Zn, Si and Zr.

8. An alloy according to claim 1 comprising
   i) a mischmetal and Mg and
   ii) Ni and one or more elements selected from the group consisting of B, Co, Cu, Fe, Cr, Mn, Zn, Si and Zr,
   where ii) to i) has an atomic ratio from about 3.1 to about 3.6.

9. A metal hydride battery, an alkaline fuel cell or a metal hydride air battery comprising an electrode comprising the hydrogen storage alloy according to claim 1.

10. A multi-phase hydrogen storage alloy, comprising one or more rare earth elements, a hexagonal Ce2Ni7 phase and a hexagonal Pr5Co19 phase, where the Ce2Ni7 phase abundance is from about 30 to about 72 wt % and the Pr5Co19 phase abundance is ≥8 wt %, based on the total alloy and the alloy further contains hexagonal CeNi3 and rhombohedral PuNi3, and wherein the alloy comprises a hexagonal MgZn2 phase in an abundance of from 0 to about 2 wt %, a hexagonal CeNi3 phase in an abundance of from about 1 to about 21 wt %, a rhombohedral PuNi3 phase in an abundance of from about 2 to about 10 wt %, a rhombohedral Pr2Ni7 phase in an abundance of from 0 to about 2 wt %, a rhombohedral Ce5Co19 phase in an abundance of from about 3 to about 12 wt % and a hexagonal CaCu5 phase in an abundance of from 0 to about 16 wt %, based on the total alloy.

11. An alloy according to claim 10 where the abundance of the Ce2Ni7 phase is from about 30 to about 71 wt % and the abundance of the Pr5Co19 phase is from about 8 to about 30 wt %, based on the total alloy.

12. An alloy according to claim 10 comprising one or more rare earth elements, Mg and Ni.

13. A metal hydride battery, an alkaline fuel cell or a metal hydride air battery comprising an electrode comprising the hydrogen storage alloy according to claim 10.

* * * * *